3,245,852
METHOD AND APPARATUS FOR MAKING SINGLE PLY AND MULTI-PLY CORRUGATED HOSE
Frank A. Martin, Akron, Andrew C. Miller, William E. Ashbaugh, and Rodney D. Murphy, North Canton, and Mark W. Helm, Canton, Ohio, assignors to The Hoover Company, North Canton, Ohio, a corporation of Ohio
Filed Mar. 26, 1963, Ser. No. 268,155
11 Claims. (Cl. 156—86)

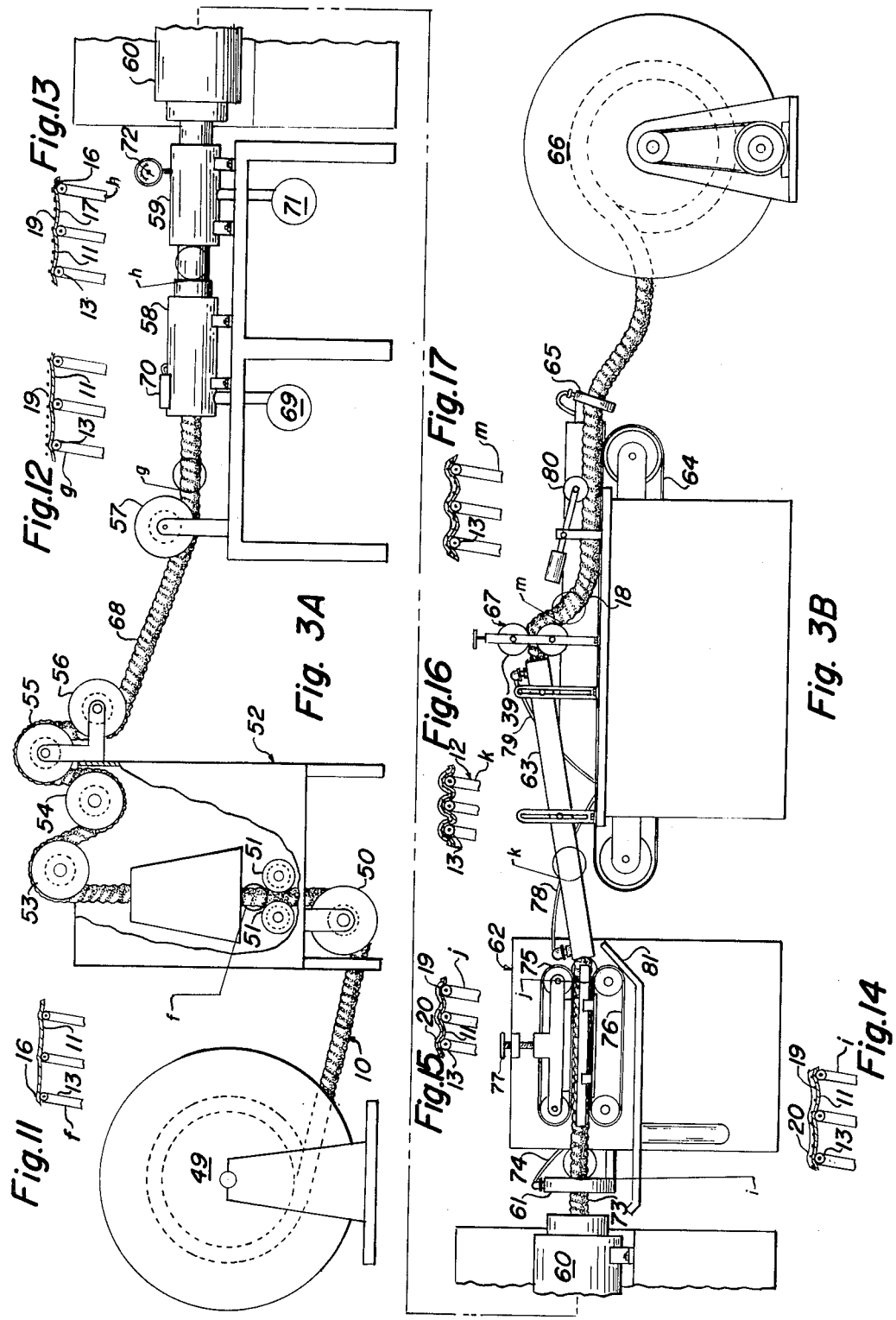

The present invention relates to the art of making flexible hose adapted for use with suction cleaners and for other purposes.

According to the invention a single ply corrugated hose is first made and then used in making a multi-ply hose. The single ply hose may also be used without applying the other plies.

The single ply hose comprises an elastomeric thermoplastic tube preferably polyvinyl chloride encasing a cylindrically coiled reinforcing coil having spaced turns with the crests of the corrugated tube being bonded to the coil turns and with the valleys of the tube extending inwardly between the coil turns to a point about even with the inner periphery of the coil.

The reinforcing coil may comprise a rigid thermoplastic coil which is bondable to the vinyl chloride tube but is preferably made of a metallic wire coated with an elastomeric thermoplastic sheath such as polyvinyl chloride.

In making the single ply hose the coil is wound with spaced turns. The initial pitch of the coil is not too important but for use with suction cleaners, a pitch of about 3 turns per inch with a coil diameter of from 1⅜ to 1½ inches has been found satisfactory.

The coil is compressed axially as the tube is extruded thereover and the tube wall setting operation of cooling is performed while the coil is at its original pitch.

The coil is heated to make the sheath soft as it passes through the extruder and a suction is drawn on the interior of the tube as it is extruded. The combined action of the heat and the suction causes the tube to become corrugated with the valleys extending inwardly between the coil turns and with the crests bonded to the outer periphery of the coil turns.

Before the hose passes the cooling station, where the tube walls are set the axial compression is released and the coil returns to substantially its original pitch forming a single ply hose of indefinite length. The finished hose may be stored on reels or fed directly to the apparatus for making a multi-ply hose.

In making the multi-ply hose the single ply hose is axially stretched to expand the coil turns beyond their original pitch and to cause the valleys of the tube wall to flatten out to almost the level of crests of the corrugations.

While the single ply hose is thus stretched it is passed through a sleeve knitter, a heating chamber, a vacuum chamber and an extruder.

At the knitter a sleeve of nylon is knitted tightly about the stretched hose into contact with the crests of the corrugations but spaced slightly from the valleys.

At the heating chamber the nylon sleeve shrinks so that its threads cut into the tube of the single ply hose at the crests of the corrugations and also moves into contact with the tube walls at the valleys of the corrugations.

The tube wall of the single ply hose is also heated sufficiently to make it soft enough that it will become bonded to a second polyvinyl chloride tube which is extruded over it at the extruder.

The suction chamber communicates with the interior of the extruder so that as the second polyvinyl chloride tube is extruded over the stretched single ply hose and nylon sleeve, air is withdrawn from between the two tubes and the wall of the second tube is drawn into contact with the wall of the first tube through the interstices of the sleeve.

Since the material of the second tube is hot and plastic and the wall of the first tube is warm they become bonded to each other through the interstices of the sleeve to form an integral wall with the sleeve trapped therein.

The sleeve forms a reinforcement for the hose wall and the corrugations render it quite flexible despite its substantial nonstretchability.

After the carcass leaves the extruder the axial stretch is relaxed and it is axially compressed to cause the carcass walls to move inwardly between the coil turns to form comparatively deep corrugations. At the same time the carcass is cooled by a cold water bath to set the material of the carcass walls while the carcass is axially compressed.

After the walls of the carcass are fixed the axial compression is relaxed and the coil assumes substantially its original pitch to thus form the multi-ply hose of the invention.

The finished multi-ply hose of indefinite length may be stored on reels for future use or it may be cut to the length desired for its ultimate use.

Other objects and advantages of the present invention will become apparent as the description proceeds when taken in connection with the accompanying drawings in which:

FIG. 3A is a schematic plan view of the front end of the apparatus of the invention for forming a multi-ply hose from the single ply hose formed by the apparatus of FIGS. 1A and 1B.

FIG. 3B is a schematic plan view of the rear end of the apparatus of FIG. 3A.

FIGURES 6 through 17 inclusive are segmented enlarged sectional views taken on a longitudinal plane at the points indicated by letters $a$ through $m$ respectively of the hose as it is processed on the apparatus of FIGURES 1A, 1B, 3A and 3B.

Figure 1:
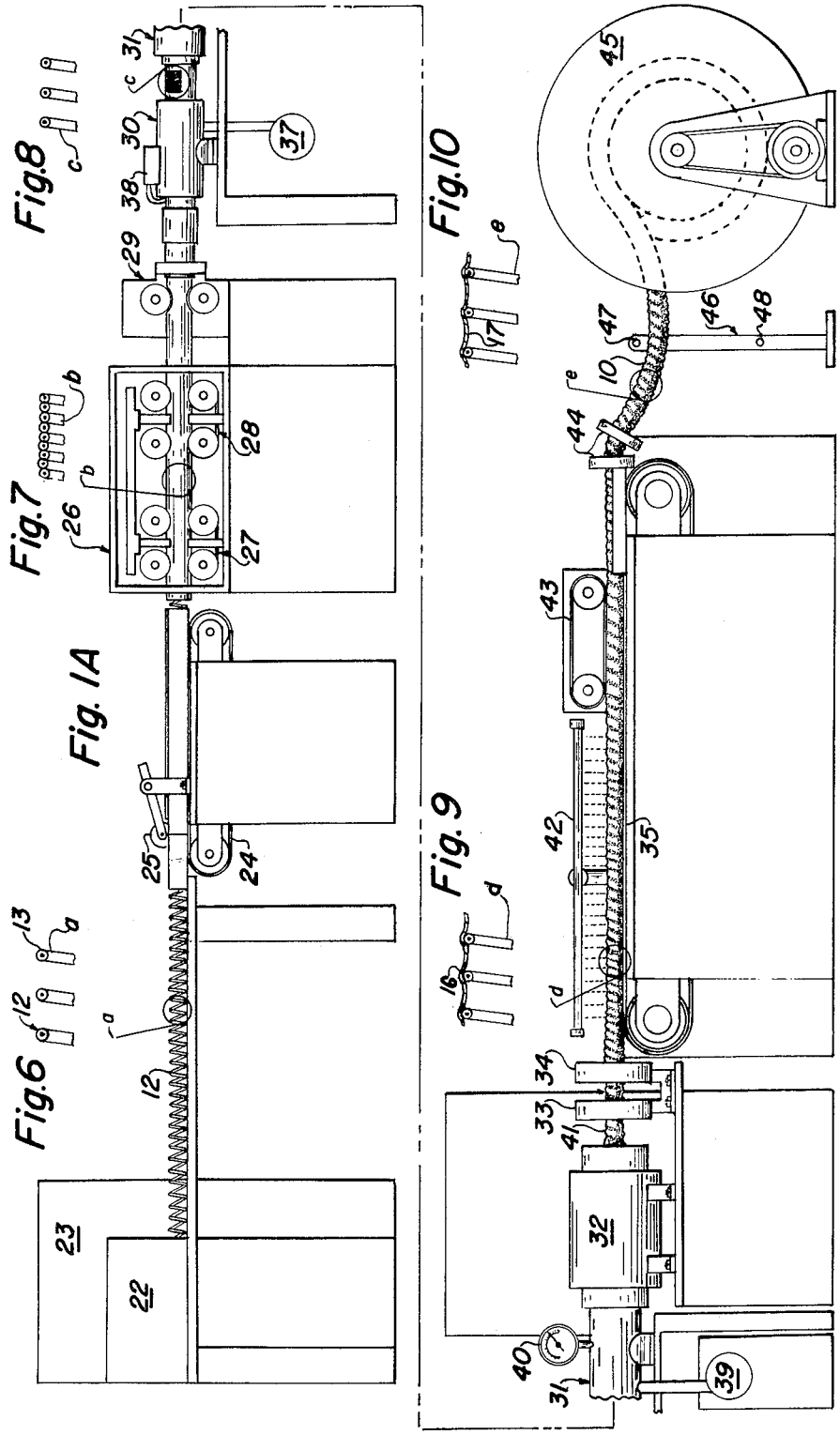
FIG. 1A is a schematic plan view of the front end of the apparatus of the invention for forming a single ply hose.
FIG. 1B is a schematic plan view of the rear end of the apparatus of FIG. 1A.
Figure 4:
FIG. 4 is a segmental enlarged sectional view of the wall of the single ply hose formed on the apparatus of FIGS. 1A and 1B.

Referring to FIG. 4 of the drawings the single ply hose made on the apparatus of FIGS. 1A and 1B is generally indicated by the reference numeral 10. It comprises a single ply elastomeric thermoplastic tube 11 covering a cylindrical helical reinforcing coil 12 having spaced turns 13.

The coil 12 is wound so that its turns 13 are normally spaced apart. The pitch may be any desired value but for purposes of illustration a spacing of 0.333″ or about three turns per inch has been selected.

The coil 12 is formed of an inner metallic wire 14 and an elastomeric thermoplastic sheath 15 encasing the wire 14.

The tube 11 is corrugated having crests 16 and valleys 17. The crests 16 are bonded to the sheath 15 and the valleys 17 extend inwardly between the coil turns 13 to about the internal diameter of the coil 12. The hose 10 may be from 1⅜ to 1½″ in diameter.

Figure 5:
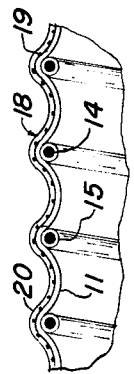
FIG. 5 is a segmental enlarged sectional view of the wall of the multi-ply hose formed on the apparatus of FIGS. 3A and 3B.

FIG. 5 shows the multi-ply hose 18 made from the single ply hose 10 of FIG. 4. The hose 18 includes a knitted sleeve 19 of nylon shrunk onto the tube 11 of the single ply hose 10 and an outer elastomeric thermoplastic tube 20 which is bonded to the inner tube 11 through the interstices of the knitted sleeve 19.

Figure 2:
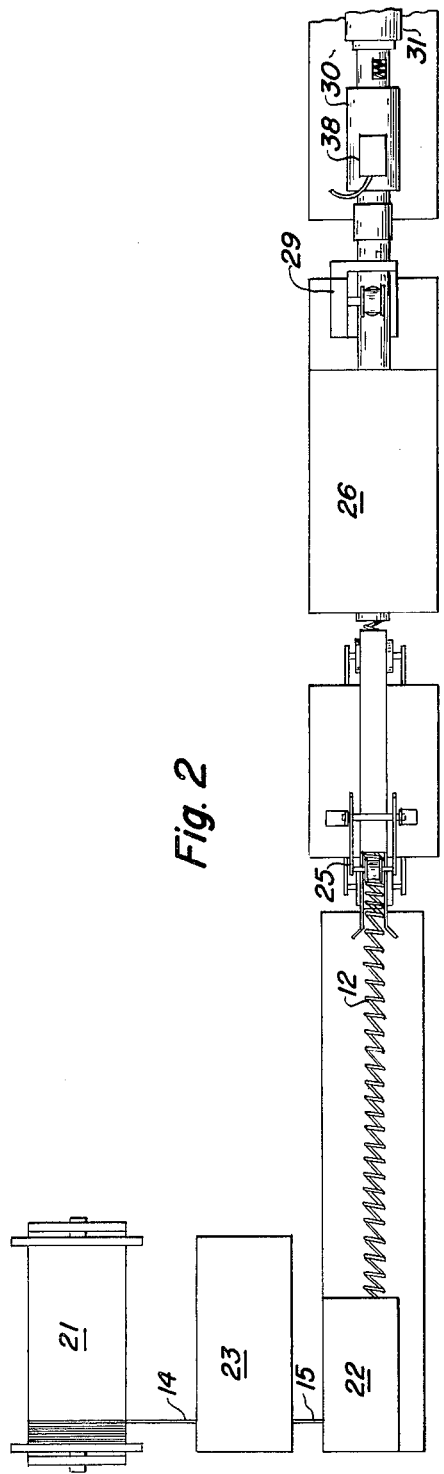
FIG. 2 is a schematic top view of the apparatus of FIG. 1A.

The wire 14 is supplied on large reels one of which is shown at 21 of FIG. 2. The reel 21 is power driven and its unreeling speed is coordinated with the winding speed of a spring coiler 22.

On its way to the spring coiler 22 the wire 14 passes through an extruder 23 where the sheath 15 is applied thereover. It is to be understood that the extruder 23 may be omitted and the sheath 15 applied to the wire 14 beforehand. In that case the sheathed wire would be wound on the reel 21.

The spring winder 22 is of the type in which the coil 12 exits axially without rotation so that coils of indefinite length may be wound.

However, it is within the scope of this invention to wind short lengths of coil and secure them in end to end relationship to form a continuous coil as in the United States patent to Pavlic 2,963,749.

The spring winder 22 is set to wind coils of about 1⅜ to 1½″ in diameter with a pitch of 0.333″ more or less, that figure having been selected merely for purposes of illustration and because the finished hose is suitable for use with suction cleaners.

As shown by FIG. 1A and FIGURE 1B the coil 12 is shown issuing axially from the spring winder 22 onto a conveyer belt 24 which is driven at a speed coordinated with the speed at which the coil 12 issues from the spring winder 22. A weighted roller 25 holds the coil 12 against the belt 24.

FIGURE 6 taken at point $a$ shows the spacing of the coil turns 13 of the coil 12 as it issues from the spring winder 22 and moves onto the conveyor 24. As previously stated a pitch of 0.333 inch has been selected.

From the conveyer 24 the coil 12 moves into a capstan 26. The capstan 26 includes two sets 27 and 28 of upper and lower conveyer belts which grip the coil 12 between them.

From the capstan 26 the coil 12 is advanced serially through a pair of upper and lower pinch rolls 29, a heating chamber 30, a vacuum chamber 31, an extruder 32, a pair of water rings 33 and 34, a water spray 42 and a conveyer belt 35.

The first set of conveyer belts 27 are driven at a faster speed than the conveyer belts 28 so that the coil turns 13 come into contact with each other between them, as shown in FIGURE 7 taken at point $b$. The drive for the belts 27 are provided with a friction clutch which slips when the coil turns 13 come into contact with each other.

The second set of conveyer belts 28 are driven at a speed to push the coil 12 through the extruder 32 so that the pitch of the coil turns 13 is increased to 0.250 inch more or less as shown by FIGURE 8 taken at point $c$. That comes about by reason of the fact that the extruder 32 offers resistance to movement of the coil 12 and thus the coil is compressed axially to the 0.250″ pitch. The resistance of the extruder is caused primarily by the small diametrical clearance of the coil 12 as it passes through the extruder 32.

The pitch of the coil 12 is held at 0.250 inch more or less until it leaves the extruder 32 when it assumes substantially the original pitch of 0.333″ as shown by FIGURE 9 taken at point $d$.

Hot air is blown into the heating chamber 30 by a fan-heater unit 37 and is exhausted through the end of the heating chamber. The temperature of the air within the chamber 30 is regulated so that the temperature within the chamber is such that the surface of the sheath 15 becomes warm for a purpose which will appear. The temperature is indicated by a temperature indicator 38.

A motor-fan unit 39 draws a vacuum of from 2 to 6 inches of water on the interior of vacuum chamber 31, the vacuum being indicated by the gage 40.

The vacuum chamber 31 communicates with the interior of the tube 11 as it is extruded to draw its walls inwardly between the coils 13 to a point at the internal diameter of the coil 12 as shown by FIGURE 9 taken at point $d$.

The material of the tube 11 being hot and the surface of the sheath 15 being warm, the tube and sheath will be bonded to each other at the crests 16.

The carcass 41 formed at the extruder 32 passes through the cooling rings 33 and 34 where sufficient water is sprayed thereon to render the surface of the tube 11 non-tacky. It is important that this cooling is not sufficient to set the material of the carcass into its final form.

The carcass 41 then passes onto the conveyor 35 and is sprinkled with cold water from a pipe 42. The water sets the carcass 41 in its final form as shown by FIGURE 9 taken at point $d$ and may be drained to waste in any manner.

The conveyor 35 includes an upper endless belt conveyer 43 which presses downwardly on the carcass 41 to hold it against conveyer belt 35.

At the end of the conveyer 43, the coil 12 is at substantially its original pitch of 0.333″ as shown in FIGURE 10 taken at point $e$. It is to be noted that the valleys 17 extend inwardly between the turns 13 to about the inner periphery of the coil 12.

As the hose 10 leaves the rear end of the conveyer 35 it passes through air rings 44 where excess water is blown therefrom.

As the hose 10 leaves the apparatus of FIG. 1B it may be coiled on a power driven reel 45, the coiling speed of which is coordinated with the speed at which the hose 10 leaves the apparatus of FIG. 1B.

This is done by means of a switch arrangement shown at 46. As shown the switch is of the electric eye type having upper and lower eyes 47 and 48.

Assume that the reel 45 is being rotated by its motor to take up the slack in the hose 10. As soon as the hose 10 reaches the upper eye 47 the reel motor is deenergized and the hose accumulates in the form of a loop in front of the reel 45. As soon as the loop reaches the lower eye 48 the reel motor is reenergized to wind another length of hose on the reel.

That will continue until the reel 45 is full at which time the full reel is replaced with an empty one.

As will appear the reel 45 and switch 46 may be omitted if the speed of the apparatus of FIGS. 1A and 1B is coordinated with that of the apparatus of FIGS. 3A and 3B.

The hose 10 made on the apparatus of FIGS. 1A and 1B may be used independently or it may be used to make a multi-ply hose on the apparatus of FIGS. 3A and 3B.

The apparatus of FIGS. 3A and 3B comprises in the order named, from left to right, a reel 49, a guide roll 50, pinch rolls 51, a knitter 52, drive rolls 53, 54, 55 and 56, guide roll 57, a heating chamber 58, a vacuum chamber 59, an extruder 60, a water ring 61, a capstan 62, a compression tube 63, pinch rolls 67, a conveyer 64, air ring 65 and a reel 66.

The pinch rolls 51 apply a retarding force to the hose 10 as it is pulled through the knitter 52 by the drive rolls 53, 54, 55 and 56, the speed of which is coordinated with that of the knitter 52. The capstan 62 pulls the carcass 68 through the heating chamber 58, vacuum chamber 59 and extruder 60, being guided by the guide roll 57. The speed of the capstan 62 is coordinated with that of the drive rolls 53, 54, 55 and 56.

The retarding force applied to the hose 10 by pinch rolls 51 is such that a constant tension is applied to the hose 10 as it passes through the knitter 52. That will cause the hose 10 to be stretched so that the coil turns 13 are spaced apart to a distance greater than their original pitch and cause the wall 11 to move outwardly so as to be almost flush with the crests 16 as shown in FIGURE 11 taken at point f.

The hose 10 remains in that stretched condition until it leaves the capstan 62. Thus the hose 10 is stretched as it passes through the knitter 52 and through the extruder 60.

At the knitter 52 a sleeve 19 of nylon is tightly knit about the stretched hose 10 to form a carcass 68. The sleeve 19 fits tightly over the crests of the hose 10 but is separated from it to some extent at the valleys. This is shown by FIGURE 12 taken at point g.

A fan-heater 69 blows hot air into the heating chamber 58, the air exiting from the open end of the chamber. The temperature of the air within chamber 58 is regulated, the temperature being indicated by the indicator 70.

The heating chamber 58 serves two functions. First, the surface of tube 11 is softened. Second, the nylon sleeve 19 is shrunk.

The shrinking of the nylon sleeve 19 causes its threads to cut into the soft surface of tube 11 at the crests 16 and to move inwardly into substantial contact with the tube 11 at the valleys 17. That is shown by FIGURE 13 taken at point h.

A motor-fan unit 71 draws a vacuum of from 25 to 30 inches of water on the interior of the vacuum chamber 59 which communicates with the interior of the extruder 60. A gage 72 is used to indicate the vacuum in the chamber 59.

At the extruder 60 the outer tube 20 is extruded over the carcass while in the position shown in FIGURE 13. The suction produced in chamber 59 will draw the air from between the outer tube 20 and the inner tube 11 and sleeve 19 and will draw the outer tube 20 into contact with the inner tube 11 through the interstices of the sleeve 19.

Since the surface of the inner tube has been heated in chamber 58 and the material of the outer tube 20 is soft as it is extruded, the outer tube 20 will be bonded to the inner tube 11 through the interstices of sleeve 19 which is thus trapped between the two tubes. The carcass 73 thus formed is shown in FIGURE 14 taken at point i.

As the carcass 73 emerges from the extruder 60 it is sprinkled with cold water from the water ring 61 which may be supplied with cold water by pipe 74. The cooling is just enough to render the surface of the carcass non-tacky and not enough to completely set the carcass 73.

The capstan 62 comprises upper and lower endless belt-type conveyers 75 and 76 which are pressed tightly against the carcass by adjusting screw 77 in order to prevent slippage.

As the carcass 73 leaves the ends of conveyers 75 and 76 the compression on the coil 12 is released and it assumes substantially its original pitch of 0.333″ with the valleys 17 substantially even with the inner periphery of coil 12 as shown by FIGURE 15 taken at point j.

The tube 63 is a combined compression and setting tube wherein the carcass is compressed as it is cooled to set the thermoplastic materials into their final form.

As shown, the tube 63 is inclined upwardly so that the weight of the carcass, which is still warm as it enters the tube 63, will compress the carcass. The pinch rolls 67 also help to compress the carcass.

The lower end of tube 63 is flooded with cold water which enters at the lower end by pipe 78. A small trickle of water enters the upper end of tube 63 by pipe 79 and flows downwardly to the lower end of tube 63. The water flows into trough 81 from which it flows to waste.

The compression of the carcass while it is still plastic will cause the coil turns 13 to move toward each other and the walls of the tube to move inwardly between the coil turns to a position inwardly of the inner periphery of the coil 12 as shown by FIGURE 16 taken at point k.

As the carcass leaves the pinch rolls 67 the axial compression of the carcass is released and it takes its final form as shown by FIGURE 17 taken at point m.

From the pinch rolls 67 the finished hose 18 drops down onto the conveyer 64, the speed of which is slightly slower than that of the capstan 62. A weighted roller 80 is provided for holding the hose 18 against the conveyer belt 64 so that there will be no slippage.

From the conveyer 64 the hose 18 is transferred to the reel 66 in a manner similar to that of FIG. 1B with a switch similar to that of switch 46 being provided. The air ring 65 plies jets of air about the periphery of the finished hose to remove and evaporate any water remaining on the hose as it is transferred to the reel 66.

If desired the reel 66 may be omitted and a cut-off device provided to cut off suitable lengths of hose for the intended use.

The hose 10 made according to the apparatus of FIGS. 1A and 1B could be fed directly into the apparatus of FIGS. 3A and 3B with the elimination of the reels 45 and 49, provided that the speeds of the two apparatuses are properly coordinated.

The hose 10 could be taken directly from the conveyer 35 of FIG. 1B and fed directly into the knitter 52 of FIG. 3B, provided the speed of the drive rolls 53, 54, 55 and 56 is sufficiently faster than that of the conveyer 35, that the hose 10 is axially extended by the proper amount as shown in FIGURE 11 taken at point f in FIG. 3A.

The operation of the apparatuses is the same as previously explained except that the reels 45 and 49 together with their appurtenances can be omitted.

While we have shown and described but a single embodiment of our invention it is to be understood that that embodiment is to be taken as illustrative only and not in a limiting sense. We do not wish to be limited to the particular method and apparatus shown and described but wish to include all equivalent variations thereof except as limited by the scope of the claims.

We claim:

1. The method of making a single ply flexible hose comprising, applying a sheath of an elastomeric thermoplastic to a metallic wire, coiling said sheathed wire into a cylindrical helix having spaced apart coil turns with an original pitch, compressing said helix to a pitch less than said original pitch, heating said helix to soften said sheath to a bonding condition, extruding a thin elastomeric thermoplastic tube over said compressed helix, applying suction to the interior of said tube as it is extruded to cause the walls thereof to be drawn inwardly between said coil turns into loops to form a corrugated carcass and to cause said sheath to be bonded to the crests of the corrugations and cooling said carcass to set said tube in its corrugated form.

2. The method of making a multi-ply hose from the single ply hose made according to claim 1 comprising, stretching said single ply hose so that the loops of said single ply hose are substantially flush with the crests thereof, knitting a sleeve of shrinkable fabric tightly over the stretched single ply hose, heating said single ply hose and said sleeve to cause said sleeve to shrink into tight contact with said single ply hose and cause the wall thereof to become soft, extruding a thin elastomeric thermoplastic tube over said stretched single ply hose and said sleeve, applying suction to the interior of said tube as it is extruded to remove air from between it and said single ply hose and to cause said tube to be drawn inwardly into contact with the thermoplastic wall of said single ply hose through the interstices of said sleeve and to cause said tube to be bonded to the wall of said single ply hose, compressing the carcass thus formed to form deep corrugations therein and simultaneously cooling said carcass to set it in its corrugated form and releasing the compression of said carcass.

3. The method of making a single ply hose comprising, applying an elastomeric thermoplastic sheath to a metallic wire, coiling said sheathed wire into a cylindrical helix having spaced coil turns with a fixed original pitch, pushing said helix through a hose forming apparatus, retarding the movement of said helix to bring said coil turns into contact with each other, releasing the retarding force to permit said coil turns to expand and assume an intermediate pitch less than said original pitch, holding said coil turns at said intermediate pitch, heating said helix to soften said sheath to a bonding condition, extruding a thin tube of an elastomeric thermoplastic over said helix while held at said intermediate pitch, applying a vacuum to the interior of said tube as it is extruded to cause the walls of said tube to become bonded to said sheath and move inwardly between said coil turns to form a corrugated carcass, permitting said coil to return to its original pitch as said tube is extruded thereover and cooling said carcass to set said thermoplastic tube to form a complete single ply hose.

4. The method of making a single ply hose comprising, forming a resilient reinforcing coil in the form of a cylindrical helix in which at least the surface of said coil comprises an elastomeric thermoplastic and having an original pitch, compressing said helix to a pitch less than said original pitch, extruding an elastomeric thermoplastic tube over said helix, heating said helix to soften its surface as it approaches said extruder, applying suction to the interior of said tube as it is extruded over said helix to cause its walls to move inwardly between the turns of said helix and thus form a corrugated carcass with the crests of the corrugations bonded to the turns of said helix and cooling said carcass to set said tube in its corrugated form.

5. The method of making a multi-ply hose comprising, applying an elastomeric thermoplastic sheath to a metallic wire, coiling said sheathed wire into a cylindrical helix having spaced coil turns with a fixed original pitch, pushing said helix through a hose forming apparatus, retarding the movement of said helix to bring said coil turns into contact with each other, permitting said coil turns to expand and assume an intermediate pitch less than said original pitch, holding said coil turns at said intermediate pitch, heating said helix to soften said sheath to a bonding condition, extruding a first thin tube of an elastomeric thermoplastic material over said helix while held at said intermediate pitch, applying suction to the interior of said first tube as it is extruded to cause the walls thereof to become bonded to said sheath and move inwardly between said coil turns to form a corrugated carcass, permitting said coil turns to return to said original pitch whereby the walls of said first tube are drawn outwardly, cooling said carcass to set said thermoplastic first tube to form a single ply hose, pulling said single ply hose through a second hose making apparatus while applying a retarding force to its movement to extend said single ply hose and cause the walls thereof between said coil turns to move outwardly substantially flush with the crests of the corrugations, knitting a sleeve of a shrinkable fabric tightly about said extended single ply hose, heating said single ply hose and sleeve to shrink said sleeve about said extended single ply hose and to soften the walls of said first tube to a bonding condition, extruding a second thin tube of an elastomeric thermoplastic over said extended single ply hose and said sleeve, applying suction to the interior of said second tube as it is extruded to remove any air between said second tube and single ply hose and to draw the wall of said second tube into contact with the wall of said first tube through the interstices of said sleeve so that the two tubes are bonded to each other with said sleeve trapped between said first and said second tube, relaxing the pulling force to permit said coils to axially contract to said original pitch, compressing the carcass thus formed to close said coils to a pitch slightly less than said original pitch to corrugate said carcass and simultaneously cooling said carcass to set the thermoplastic material thereof in corrugated condition and releasing said compressing force to permit said coil turns to assume said original pitch and thus form a finished multi-ply hose.

6. An apparatus for making a flexible hose comprising, a reel upon which a metallic spring wire is wound, means for applying an elastomeric thermoplastic sheath to said wire, a spring winder for coiling said sheathed wire into a cylindrical helical coil having spaced turns, means for driving said reel for unwinding said wire therefrom at a speed coordinated with that of said spring winder, a first conveyer for moving said coil away from said winder at a speed coordinated with that of said spring winder, a capstan having two sets of moving belt conveyors for contact with the upper and lower sides of said coil as it moves off of said first conveyor, said first set moving said coil at a faster speed than said second set to bring the turns of said coil into contact with each other between the two sets, said second set moving at a slower speed than said first conveyer, a heater for said coil to bring said sheath to a bonding condition, a vacuum chamber, an extruder for extruding a thin elastomeric thermoplastic tube over said coil, the resistance to movement of said coil through said extruder serving to apply an axial compression to said coil, said vacuum chamber being connected to the interior of said tube as it is extruded to draw the walls thereof into loops between the turns of said coil to form a corrugated carcass and to cause said tube to bond to said sheath at the crests of the corrugations, a water ring applying a preliminary cooling to said carcass, a water spray for sprinkling water over said carcass to set it in its corrugated condition to form a single ply hose, a second conveyer travelling at the same speed as said first conveyer for moving said hose away from said water spray and for releasing the compression on said hose, an air spray for blowing excess water from said hose, a power driven reel upon which said hose is wound and switch means responsive to the speed at which said hose is formed for controlling the rotation of said reel.

7. Apparatus for making a multi-ply hose from a corrugated single ply hose in the form of a first elastomeric tube reinforced by an inner cylindrical helical coil having spaced turns with the wall of said first tube lying between the turns of said coil in the form of loops extending inwardly between said coil turns to a point even with the inner periphery of said coil in which said single ply hose is moved axially through the apparatus, comprising, a knitter for knitting a sleeve of shrinkable fabric over said single ply hose, means for pulling said single ply hose through said knitter, means for applying a retarding force to movement of said single ply hose through said knitter whereby said single ply hose is stretched as said sleeve is applied, means for applying a second elastomeric thermoplastic tube over said sleeve and single ply hose, means for holding said sleeve and second ply hose stretched as said second tube is applied, means for applying suction between said tubes as said second tube is applied to remove air from between them and to draw said second tube into contact with said first tube through the interstices of said sleeve, means for heating said sleeve and first tube before said second tube is applied to shrink said sleeve into tight contact with said first tube and to cause said tubes to bond to each other through the interstices of said sleeve whereby an integral hose carcass is formed, means for compressing said carcass axially to cause its wall to move inwardly between the turns of said coil, means for applying a cooling medium to said carcass while it is axially compressed to set the walls thereof and means for releasing the compressive force on said carcass to permit it to expand so that the turns of said coil assume their original pitch and thus form the finished multi-ply hose.

8. The method of making a multi-ply hose comprising, forming a cylindrical helical reinforcing coil having an elastomeric thermoplastic surface and spaced turns, compressing said helical coil to a pitch less than the original pitch of said spaced turns, extruding a first elastomeric thermoplastic tube over said coils, applying suction to the interior of said first tube as it is extruded to form a corrugated construction with the wall of said first tube lying between said coil turns in the form of loops extending inwardly of said coil, applying heat to said coil prior to the extrusion of said first tube to soften the surface of said coil to cause it to become bonded to the crests of said first tube, permitting said coil to assume its original pitch, cooling said first tube to set it and form a single ply corrugated hose, stretching said single ply hose so that said coil turns assume a pitch greater than their original pitch, and said first tube flattens out, knitting a sleeve of heat shrinkable fabric tightly over said stretched single ply hose, heating said sleeve and stretched single ply hose to cause said sleeve to shrink into close contact with said first tube and soften said first tube, extruding a second elastomeric thermoplastic tube over said stretched single ply hose and sleeve, applying suction between said tubes as said second tube is extruded to remove the air from between them and to draw said second tube into contact with the first between the interstices of said sleeve to form a carcass, axially compressing said carcass to cause said coil turns to assume a pitch less than their original pitch and to cause the wall of said carcass to move inwardly between said coil turns, cooling said compressed carcass to set the material of its wall and releasing the compression of said carcass to permit said coils to assume their original pitch thus forming a finished multi-ply hose.

9. An apparatus for making a flexible hose comprising in combination, a spring winder for coiling a thermoplastic sheathed wire into a cylindrical coil having spaced turns, means for delivering said cylindrical coil to a capstan having two sets of moving belt conveyors for contact with the upper and lower sides of said coil, said first set moving said coil at a faster speed than said second set, a heater for said coil to bring said sheath to a bonding condition, a vacuum chamber, an extruder for extruding a thin elastomeric thermoplastic tube over said coil, a third moving belt conveyor serving to apply axial compression to said coil as said coil moves through said heater, vacuum chamber and extruder, said vacuum chamber being connected to the interior of said tube as it is extruded to draw the walls thereof into loops between the turns of said coil to form a corrugated carcass and to cause said tube to bond to said sheath at the crests of the corrugations, a first water spray for cooling the surface of said carcass, a second water spray for sprinkling water over said carcass to set it in its corrugated condition, said hose being released from axial compression after release from the said third moving belt conveyor to form a single ply hose.

10. An apparatus for making a multi-ply hose from the hose made on the apparatus according to claim 9, comprising, a knitter for knitting an open meshed sleeve of shrinkable fabric over said single ply hose, means for pulling said single ply hose through said knitter, means for applying a retarding force to movement of said single ply hose through said knitter whereby said single ply hose is stretched as said sleeve is applied, means for applying a second elastomeric thermoplastic tube over said knitted sleeve and single ply hose, means for holding said sleeve and second ply hose stretched as said second tube is applied, means for applying suction between said single ply hose and said second thermoplastic tube to draw said second tube into contact with said single ply hose through the interstices of said sleeve, means for heating said sleeve and said single ply hose to shrink said knitted sleeve into contact with said single ply hose and to cause said second elastomeric tube to bond to said single ply hose through the interstices of said knitted sleeve, means for applying a cooling medium to the assembly of said second thermoplastic tube, said knitted sleeve and said single ply hose while said assembly is axially compressed, and means for releasing the compressive force on said hose assembly to permit said hose assembly to expand and thus form the finished multi-ply hose.

11. The method of making a multi-ply hose from a corrugated single ply hose in the form of a first elastomeric tube reinforced by an inner cylindrical helical coil having spaced turns with the wall of said first tube extending inwardly between said turns in the form of loops, comprising, applying a stretching force to said single ply hose so that said first tube substantially flattens out, knitting a reinforcing sleeve of heat shrinkable fabric over said single pl yhose, heating said single ply hose and said sleeve to cause said sleeve to shrink into contact with said single ply hose, extruding a second thermoplastic tube over said single ply hose and said reinforcing sleeve, applying suction to the space between said first and second thermoplastic tubes to cause said second tube to be drawn into contact with first tube through the interstices of said sleeve and to cause said second tube to be bonded to the wall of said first tube with said sleeve trapped between them, relieving said stretching force and applying a compressive force to the carcass thus formed to form deep corrugations therein, cooling said carcass to set it in a corrugated form and releasing said compressive force.

References Cited by the Examiner
UNITED STATES PATENTS

| | | | |
|---|---|---|---|
| 2,730,762 | 1/1956 | Ballard | 156—143 XR |
| 2,931,069 | 4/1960 | McCormick | 156—244 XR |
| 2,963,749 | 12/1960 | Pavlic | 156—244 XR |
| 2,963,750 | 12/1960 | Pavlic | 156—244 XR |
| 3,028,289 | 4/1962 | Roberts et al. | 156—144 XR |
| 3,073,351 | 1/1963 | Nichols | 138—131 |
| 3,082,289 | 3/1963 | Allen | 156—143 XR |

EARL M. BERGERT, *Primary Examiner.*